United States Patent
Pribonic

(10) Patent No.: US 6,293,376 B1
(45) Date of Patent: Sep. 25, 2001

(54) APPARATUS INCLUDING EDDY CURRENT BRAKING SYSTEM

(75) Inventor: Edward M. Pribonic, Seal Beach, CA (US)

(73) Assignee: Magnetar Technologies LTD, Seal Beach, CA (US)

( * ) Notice: Subject to any disclaimer, the term of this patent is extended or adjusted under 35 U.S.C. 154(b) by 0 days.

(21) Appl. No.: 09/447,206

(22) Filed: Nov. 22, 1999

(51) Int. Cl.$^7$ ...................................... B60L 7/28
(52) U.S. Cl. .................. 188/165; 188/180; 187/350; 187/351; 187/361
(58) Field of Search .................. 188/41, 159, 164, 188/165, 180, 188; 187/350, 351, 361; 104/53, 281, 283, 286, 290

(56) References Cited

U.S. PATENT DOCUMENTS

| | | | |
|---|---|---|---|
| 4,449,615 | 5/1984 | Beath et al. | 188/67 |
| 4,482,034 | 11/1984 | Baermann | 188/165 |
| 4,484,666 * | 11/1984 | Steinmetz et al. | 188/165 |
| 4,676,173 | 6/1987 | Mielcarek et al. | 105/209 |
| 5,023,499 | 6/1991 | Kuwahara | 310/105 |
| 5,467,850 * | 11/1995 | Skalski | 188/165 |
| 5,518,087 | 5/1996 | Hwang et al. | 187/374 |
| 5,628,690 | 5/1997 | Spieldiener et al. | 472/131 |
| 5,749,534 | 5/1998 | Morimoto | 292/288 |
| 5,797,472 * | 8/1998 | Kamani et al. | 187/373 |
| 5,804,897 | 9/1998 | Kuwahara | 310/77 |
| 5,862,981 | 1/1999 | Kröger et al. | 188/165 |
| 5,944,149 | 8/1999 | Kuwahara | 188/156 |
| 6,001,022 * | 12/1999 | Spieldiener et al. | 472/131 |
| 6,003,636 * | 12/1999 | Yumura | 187/376 |
| 6,062,350 | 5/2000 | Spieldiener et al. | 188/161 |

FOREIGN PATENT DOCUMENTS

WO9632172  10/1996  (WO).

\* cited by examiner

Primary Examiner—Robert J. Oberleitner
Assistant Examiner—Bradley King
(74) Attorney, Agent, or Firm—Walter A. Hackler

(57) ABSTRACT

Eddy current braking apparatus includes a linear array of spaced apart permanent magnets arranged for defining a slot therebetween. A diamagnetic or non-magnetic fin is disposed and sized for movement through the slot. A pivotal linkage enables the magnets to move with respect to the fin from a spaced apart first position to a second position in which the fin passes through the slot. A control mechanism selectively moves the magnets between the first and second positions.

8 Claims, 3 Drawing Sheets

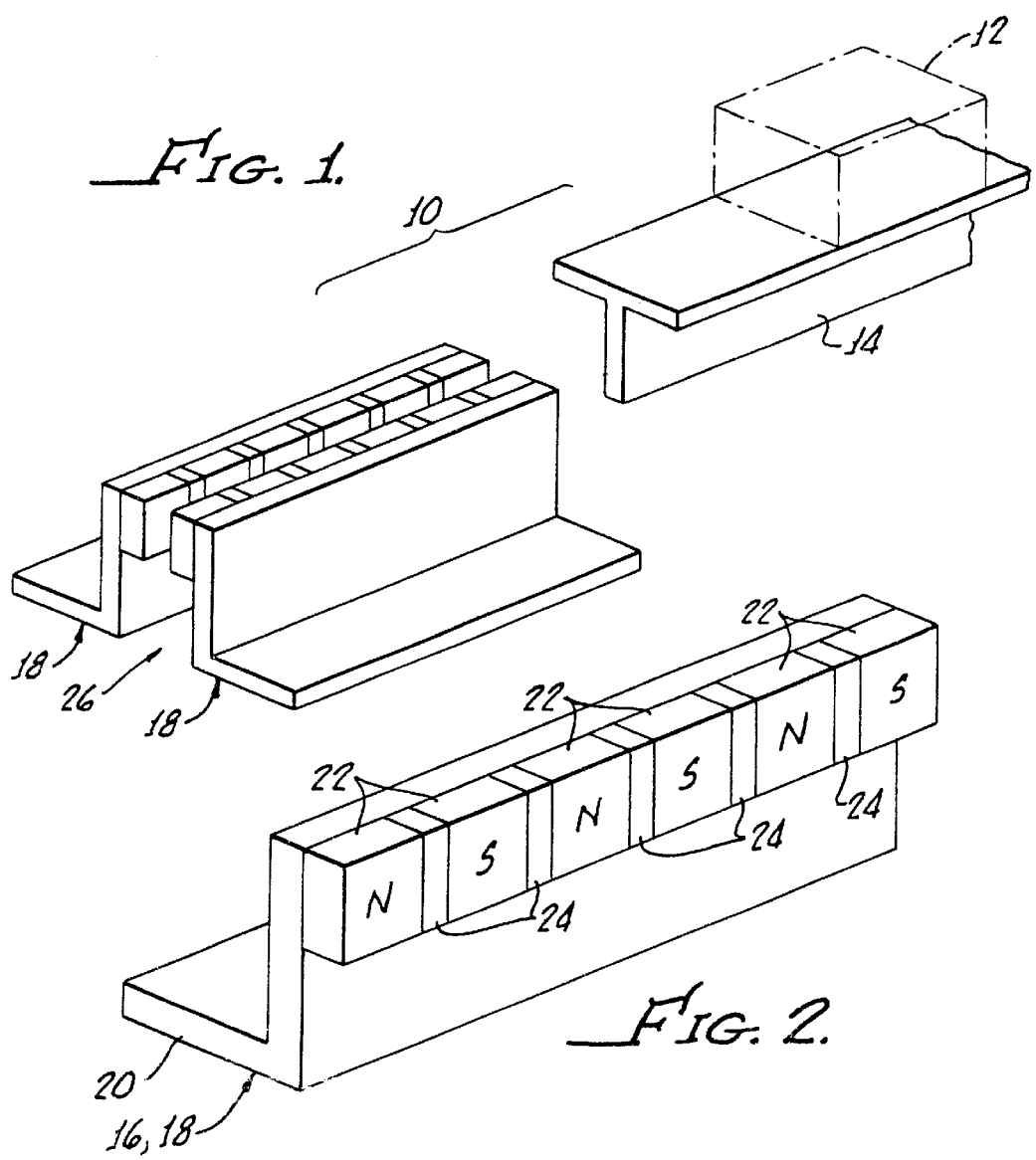
FIG. 1.
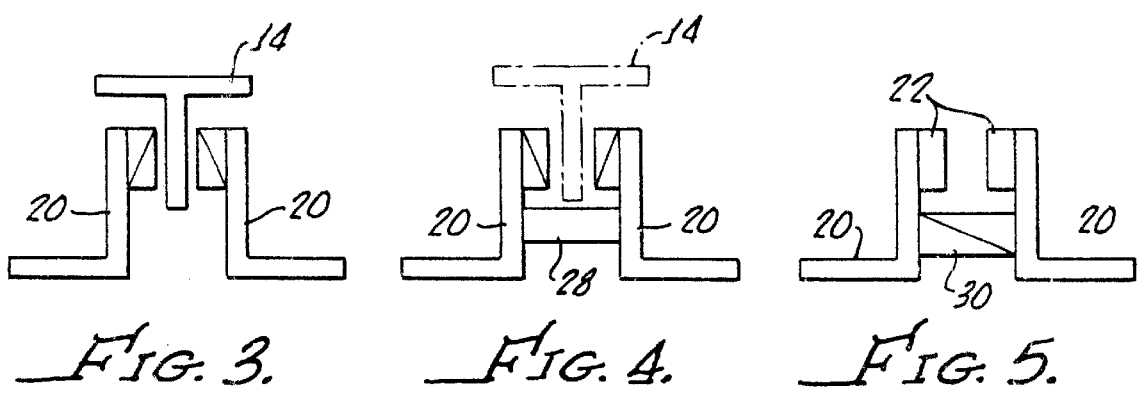
FIG. 2.
FIG. 3. FIG. 4. FIG. 5.

APPARATUS INCLUDING EDDY CURRENT BRAKING SYSTEM

BACKGROUND

BACKGROUND OF THE INVENTION

The present invention relates generally to moving apparatus requiring relatively rapid deceleration to a lower velocity upon reaching a predetermined point along its path of movement.

SUMMARY OF THE INVENTION

In accordance with the practice of the present invention, an object, apparatus or vehicle which is moving along a given path is provided with braking means which is automatically actuated to reduce the object velocity on reaching a predetermined point along the path of movement. In a first embodiment, a linear array of spaced apart permanent magnets are arranged along the object path of movement from the predetermined braking point to a further point sufficient to accomplish the desired amount of braking. The object includes a diamagnetic or nonmagnetic member which extends between the spaced apart magnets on the object reaching the predetermined point along the movement path and remains so-positioned throughout the full length of the array. The relative movement between the magnets and the member causes eddy currents to be induced in the member resulting in a braking force being exerted on the member and thus on the object.

In another embodiment, the moving object includes one or more sets of spaced apart permanent magnets affixed thereto. On the object reaching the predetermined braking point of the path of movement, it encounters a diamagnetic or nonmagnetic member that extends between the sets of spaced apart magnets producing the eddy current braking force as in the first embodiment.

In yet another version, actuation means are carried by the object for selectively locating the diamagnetic/nonmagnetic member or magnets, as the case may be, in operating relation with the magnets or member arranged along the path of movement on the object reaching the predetermined point of the path.

BRIEF DESCRIPTION OF THE DRAWINGS

These and other objects and advantages of the present invention will become more readily apparent upon reference to the following detailed description and upon reviewing the attached drawings, in which:

FIG. 1 is a perspective view of one embodiment of the present invention;

FIG. 2 is a perspective view of one half of a linear array of magnets for use in the invention;

FIG. 3 is an end elevation of FIG. 1;

FIG. 4 is an end elevational view of a magnet array of a second embodiment of the invention;

FIG. 5 is an end elevational view of a magnet array of a third embodiment of the invention;

DESCRIPTION OF PREFERRED EMBODIMENTS

Figure 6:
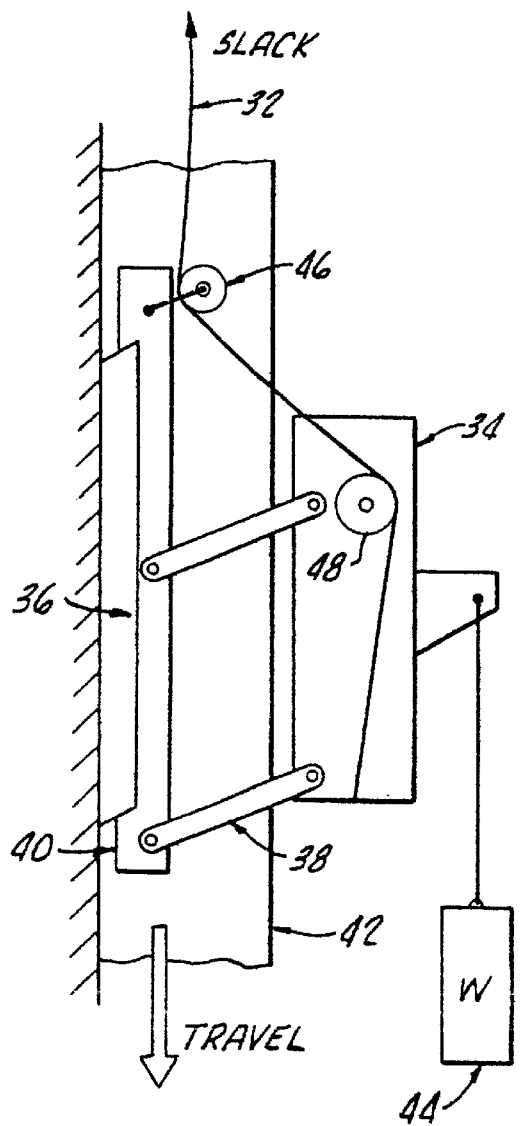
FIG. 6 depicts an elevational schematic view of a braking system for operation in a vertical direction, shown disengaged.

For the ensuing description of a first embodiment of braking apparatus 10 of this invention for an object 12, reference is made particularly FIGS. 1–3. The object 12 is shown in generalized form only and is contemplated for movement in the direction of the arrow. Affixed to the object is a T-shaped member or fin 14 which extends outwardly from the object and also moves with the object in the direction of the arrow.

At some point along the path of movement there are mounted first and second laterally spaced magnet arrays 16 and 18. Each array includes an elongated support wall 20 which is L-shaped in cross-section and on a lateral surface thereof there are provided a linear series of permanent magnets 22, with adjacent magnets separated by diamagnetic or nonmagnetic spacers 24. More particularly, the magnets alternate in polarity as indicated by the identification letters "S" and "N". Also, the space 26 between the arrays is so-dimensioned and arranged with respect to the object path of movement that the fin will move along the space directly opposite the magnets and spacers, but remaining out of physical contact with either the magnets or spacers.

On the object reaching the magnet arrays 16 and 18 and the fin 14 passes through the magnetic field existing in the space 26, an electric current (eddy current) is induced in the fin which reverses as the fin passes from a magnet of one polarity to a magnet of opposite polarity. These eddy currents produce a force exerted on the fin (and object) of such direction as to reduce the velocity of movement of object and fin. It is this deceleration that produces the "braking" of the present invention.

Although the above-described first embodiment includes movement of the object and fin past fixedly located magnet arrays, the magnet arrays can just as well be moved past a stationary object and fin. All that is needed to achieve the braking effect is relative movement between the magnets and fin. Since usually the object is moving, in that case the magnet arrays would be carried by the object and the fin fixedly mounted adjacent the path of movement. The choice of which technique to employ depends upon the particular application.

In its more general aspects, the invention can be advantageously employed for braking a large variety of moving objects. As an excellent example, eddy current braking for elevators could be highly advantageous as an emergency measure where normal operation has somehow been interfered with or disrupted. Also, many amusement park rides could benefit by having eddy current braking devices to retard excessive speed as the "ride" vehicle takes a corner or drops at a severe angle.

It is important to note that the described eddy current braking system may be adapted to an object moving along a horizontal path, a vertical path, or at any intermediate angular path. Rotary motion can be braked by the same techniques with an appropriate modification of magnet holding apparatus and fin design.

Turning now to FIG. 4, the magnetic array portion of the invention is seen to be modified to include a member 28 extending across the air gap 26 from one support wall 20 to the other below the magnets 22 sufficiently that no contact is made with a fin 14 passing therethrough. Preferably the member 28 is made of a ferromagnetic material which improves magnetic coupling during operation of the braking system.

A further embodiment is that shown in FIG. 5 where a magnetic material lower wall 30 extends between the two support walls just below the point of maximum reaching of the fin moving through space 26. This construction enhances the magnetic characteristics of the overall system in a substantial way.

Figure 7:
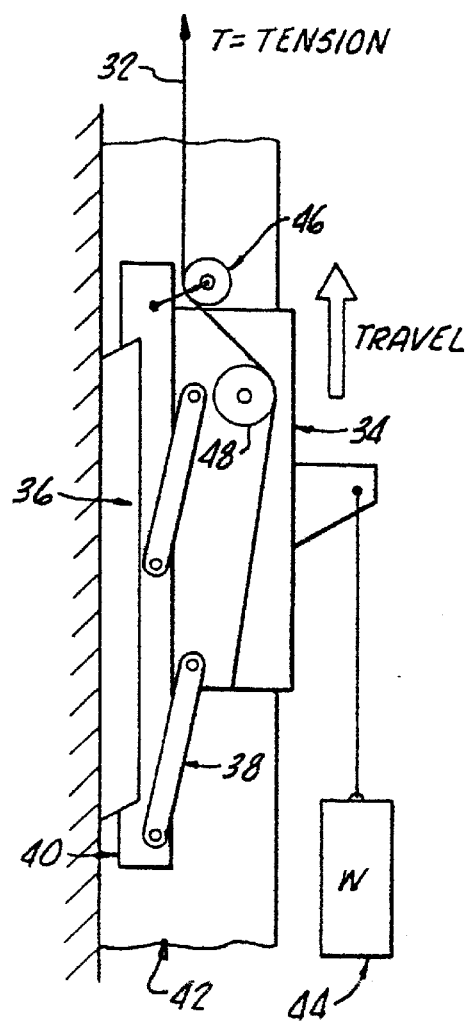
FIG. 7 shows the vertical system of FIG. 6 engaged.

FIGS. 6 and 7 depict a braking system of the invention as particularly applied to a vertically extending cable, rope or chain 32 which is automatically braked on the cable tension increasing beyond a prescribed minimum. A magnet carrier 34 is interconnected to a track or slide device 36 via a four-bar pivotal linkage 38. The magnet carrier also includes a base 40. A fin 42 is mounted adjacent the magnet carrier 34 and magnetically coupled with the magnets on the cable 32 changing from a slack condition (FIG. 6) to one of tension thereby producing eddy current braking as already described. A counterweight 44 hangingly connected to the magnet carrier 34 maintains the braking system disengaged while the cable is slack (FIG. 6). However, the cable which passes over pulleys 46 and 48 on experiencing tension engages the braking system (FIG. 7).

Figure 8:
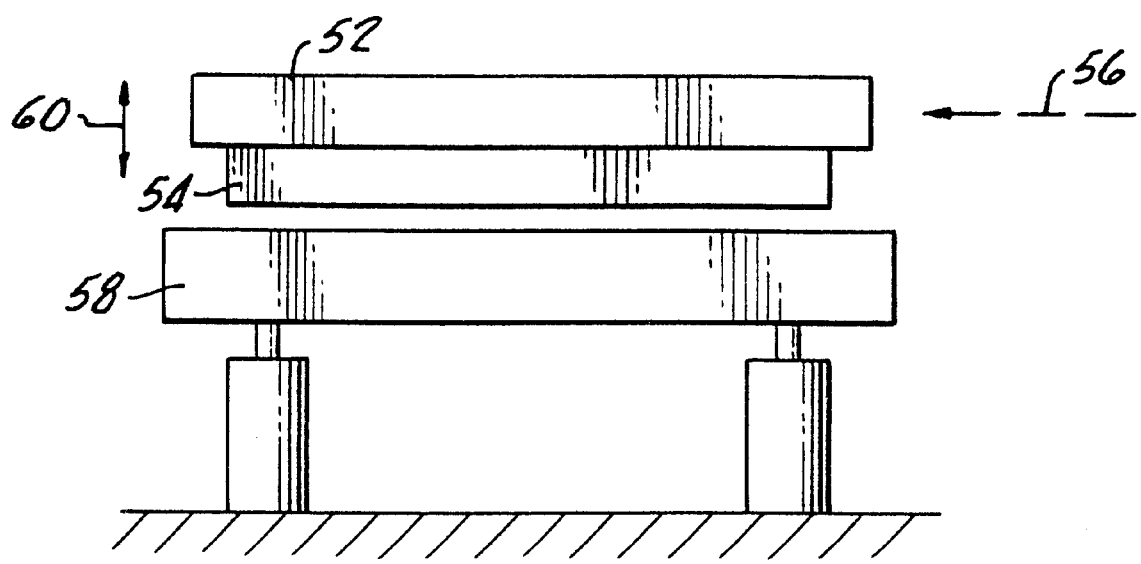
FIG. 8 shows a selectively actuatable braking system disengaged.
Figure 9:
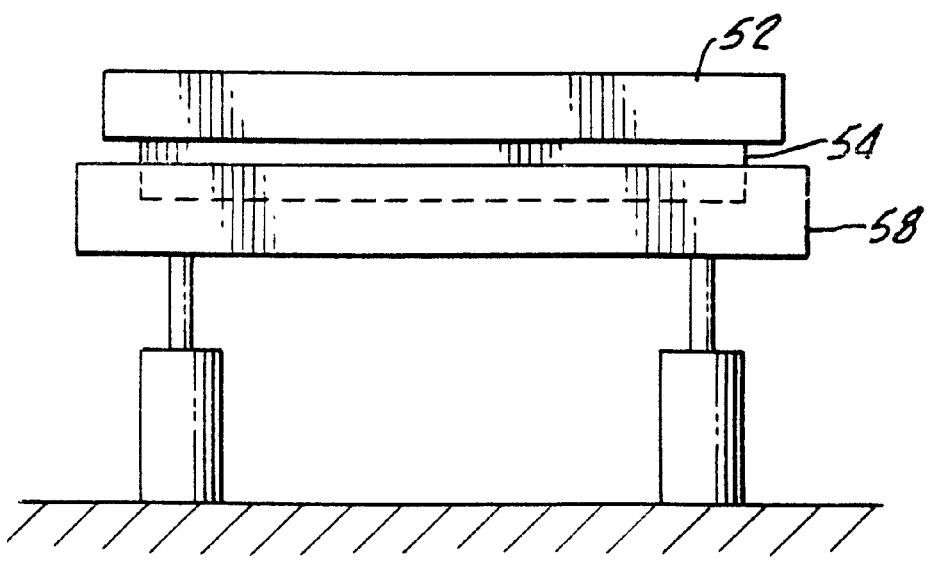
FIG. 9 shows the system of FIG. 8 engaged.

FIGS. 8 and 9 show an eddy current braking system which does not automatically operate open relative movement being established, but is selectively actuatable depending upon any of a number circumstances indicating the need or desirability for braking. An object 52 with a brake fin 54 interconnected therewith moves generally along the direction 56 which normally will pass by a magnet carrier 58 beyond the range of substantial magnetic interaction (FIG. 8). The object 52 and fin 54 are provided with means 60 selectively actuatable for moving them toward the magnet carrier so as to effect magnetically coupling therewith (FIG. 9) and achieve braking.

Although there has been hereinabove described a specific arrangement of eddy current braking apparatus in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. Eddy current braking apparatus comprising:
    a linear array of spaced apart permanent magnets attached to a stationary surface;
    a diamagnetic or non-magnetic moveable fin;
    control means for selectively causing the magnets and member to pass one another at a distance sufficient to cause eddy current to be introduced in the member, resulting in a braking force between the magnets and the member, said control means includes means for moving the magnets in a direction generally perpendicular to the moveable fin, the means for moving the magnets including a pivotal linkage interconnecting the magnets and the stationary surface, the moveable fin being disposed between said stationary surface and the magnets and the control means including a line disposed around a set of pulleys, for moving the magnets adjacent the fin upon tension being applied to the line.

2. The apparatus according to claim 1 wherein said control means includes a counterweight for biasing said magnets away from the moveable fin.

3. The apparatus according to claim 2 wherein the moveable fin is disposed for movement in a vertical direction.

4. Eddy current braking apparatus comprising:
    a linear array of spaced apart permanent magnets arranged to define a slot therebetween;
    a diamagnetic or non-magnetic fin disposed and sized for movement through said slot;
    a linkage pivotally mounting the magnets to a stationary surface, for enabling the magnets to move from a spaced apart first position with respect to the fin to a second position in which the fin passes through the slot; and
    control means for selectively moving the magnets between the first position and the second position, said control means including a line, disposed around a set of pulleys for enabling tension applied to said line to move the magnets from the first position to the second position.

5. The apparatus according to claim 4 wherein said control means includes a counterweight for biasing said magnets toward the first position.

6. The apparatus according to claim 5 wherein the fin is disposed for movement in a vertical direction.

7. In an eddy current braking system including a linear array of permanent magnets and a diamagnetic or non-magnetic fin mounted for passage past one another, an improvement comprising:
    a pivotal linkage interconnecting the magnets and a stationary surface, the fin being disposed between said stationary surface and the magnets;
    a set of pulleys; and
    a line disposed around said set of pulleys for moving the magnets toward the fin upon tension being applied to said line.

8. The improvement according to claim 7 further comprising a counterweight for biasing the magnets away from the fin.

* * * * *